United States Patent [19]

Hirota et al.

[11] Patent Number: 4,602,513

[45] Date of Patent: Jul. 29, 1986

[54] PRESSURE CONVERTER

[75] Inventors: Hisatoshi Hirota; Masahide Ishikawa; Etsumi Nakano, all of Hachioji, Japan

[73] Assignees: Nihon Radiator Company, Limited, Tokyo; TGK Company, Limited, Hachioji, both of Japan

[21] Appl. No.: 724,650

[22] Filed: Apr. 18, 1985

[30] Foreign Application Priority Data

Sep. 27, 1984 [JP] Japan .............................. 59-144968[U]

[51] Int. Cl.$^4$ ...................... G01L 9/02; H01L 10/10
[52] U.S. Cl. .................................. 73/725; 338/32 R; 338/42
[58] Field of Search ................ 73/725, 719, 728, 722; 338/42, 32 R

[56] References Cited

U.S. PATENT DOCUMENTS 4,006,402 2/1977 Mincuzzi ........................ 338/32 R
4,512,199 4/1985 Woodward et al. ............... 73/725

FOREIGN PATENT DOCUMENTS 205042 12/1982 Japan .

Primary Examiner—Donald O. Woodiel
Attorney, Agent, or Firm—Wenderoth, Lind & Ponack

[57] ABSTRACT

A pressure converter which comprises a cylindrical main body consisting of an outer casing portion and an inner casing portion, said outer casing having a pressure inlet and being divided by a diaphragm into an air-tight chamber above the diaphragm and an operation chamber below the diaphragm, a piston supported by a pair of annular spring plates within the operation chamber for vertical movement and having an engaging member provided at one end, a stopper interposed between the spring plates, a magnetic resistance provided in a lower portion of the operation chamber to produce output voltage which varies depending upon the position of a permanent magnet positioned on a movable member in opposition to the magnetic resistance and a spring anchored to the inner casing portion and the movable member to normally bias the movable member to engage the piston.

6 Claims, 6 Drawing Figures

PRESSURE CONVERTER

BACKGROUND OF THE INVENTION

1. Field of the Technique

This invention relates to a pressure converter adapted to convert pressure into an electric signal.

2. Prior Art

There have been proposed and practically employed a variety of pressure converters adapted to convert various pressures to be applied to pistons of internal combustion engines in automobiles such as oil, air, coolant pressures and pressures for air conditioning, for example, into any form such as electric signals, for example.

One prior art pressure converter is illustrated and described in Japanese Laid-Open Utility Model Application No. 205,042/82. The prior art pressure converter generally comprises a cap having a center pressure inlet; a main body partially covered by the cap and having a vertically extending center through opening, a contoured upper surface and a downwardly extending reduced diameter cylindrical portion, said cylindrical portion being formed in the side wall with a vertical notch; a diaphragm pinched between the undersurface of the cap and the contoured upper surface of the main body; a piston received within the cylindrical portion of the main body for vertical movement; a piston rod connected to and extending upwardly from the piston through the center through opening in the main body and having an integral center disc at the upper end of the rod; a potentiometer mounted on the outer surface of the main body cylindrical portion; a lever pivoted to the potentiometer for vertical movement and connected to the piston through the vertical notch; a lower member connected to the lower end of the main body and having an external terminal extending downwardly from the lower member and connected to the potentiometer; a return spring received within the lower member to normally bias the piston upwardly; and an adjusting rod contacting the spring to adjust the biasing force of the spring.

As the pressure within the chamber defined between the inner surface of the cap and the upper surface of the diaphragm increases by allowing pressure to flow axially into the chamber through the pressure inlet in the cap, when the pressure within the chamber overcomes a force which is the product of the force of the return spring, the effective pressure receiving area of the diaphragm and the introduced pressure, the diaphragm is depressed down together with the piston rod end disc which in turn pushes the piston down deep into the cylindrical portion of the main body to thereby push the lever engaging in the piston downwardly.

As the piston moves downwardly under the increased pressure within the chamber as mentioned hereinabove, the lever associated with the potentiometer follows the downward movement of the piston and as a result, the resistance value within the potentiometer varies. That is, the linear movement of the diaphragm is not required to be converted into a rotational movement because the potentiometer is not a rotary type, but a linear slide type.

However, in the pressure converter described just above, since the piston adapted to receive pressure is biased by the return spring, when subjected to pressure, the piston moves downwardly frictionally in the axial direction against the force of the return spring and thus, frictional resistance produces between the piston and spring to cause loss of pressure. Therefore, when the pressure is converted into an electric signal, the electric signal fails to represent the net value of the applied pressure.

SUMMARY OF THE INVENTION

Therefore, the present invention has its purpose to provide a pressure converter which eliminates the disadvantages inherent in the conventional pressure converters. According to the present invention, the purpose is achieved by the arrangement in which the load bearing piston and annular spring plates mounted on the piston do not frictionally move relative to each other. In the pressure converter of the present invention, the interior of an outer casing portion is divided by a diaphragm into an air-tight chamber positioned above the diaphragm and in communication with a pressure inlet formed in the outer casing portion and an operation chamber positioned below the diaphragm, a piston is adapted to move vertically through the hole in the diaphragm as the pressure within the air-tight chamber varies and is supported wthin the operation chamber by a pair of annular spring plates each having a plurality of radially extending spring pieces, a stopper is provided within the operation chamber, an engaging member is provided on the piston for engaging the stopper, a magnetic resistance is provided in a lower position of the operation chamber to produce an output voltage which varies as a permanent magnet approaches and moves away from the magnetic resistance, and a spring-loaded movable member is pivotably provided in opposition to the magnetic resistance and supports the permanent magnet at the leading end thereof, the lower end of the piston engaging the upper surface of the movable member.

According to the present invention, the annular spring plates are arranged in a pantographic fashion so that the operation direction of the spring plates is determined by the pantograph arrangement and no frictional resistance produces between the piston and spring plates to thereby eliminate loss of pressure whereby pressure can be converted into an electric signal precisely representing the magnitude of the applied pressure.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

PREFERRED EMBODIMENT OF THE INVENTION

Figure 1:
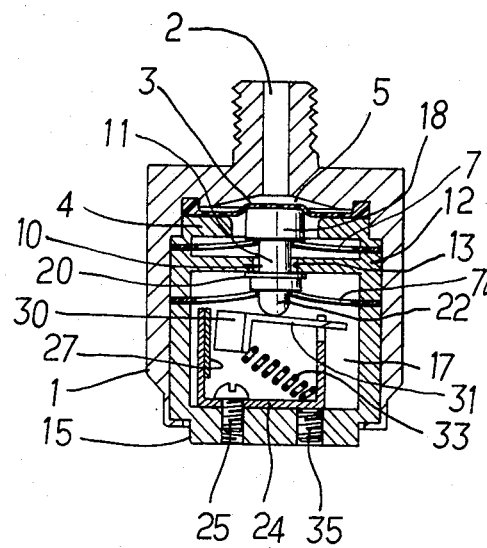
FIG. 1 is a vertically sectional view of the pressure converter embodying the principle of the invention.
Figure 2:
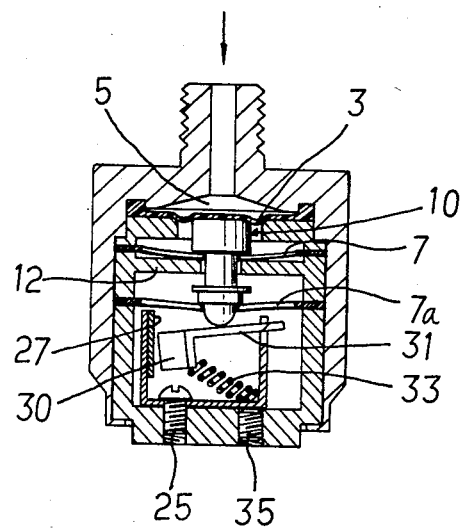
FIG. 2 is similar to FIG. 1, but shows the pressure converter in its operative condition.
Figure 3:
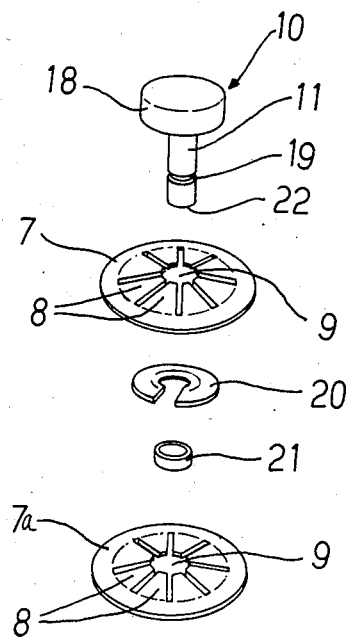
FIG. 3 is a fragmentary perspective exploded view on an enlarged scale of the piston and pair of annular spring plates.
Figure 4:
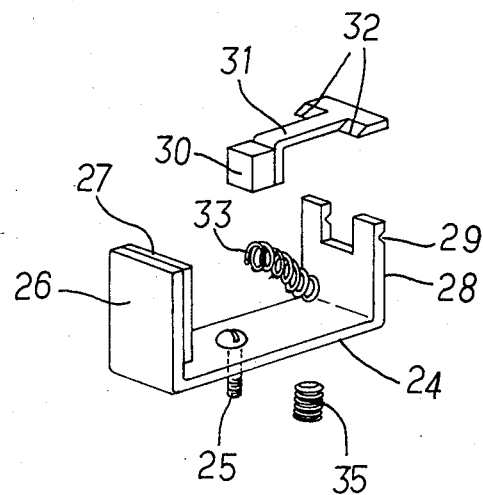
FIG. 4 is a fragmentary perspective exploded view showing the relationship between the yoke and movable member.
Figure 5:
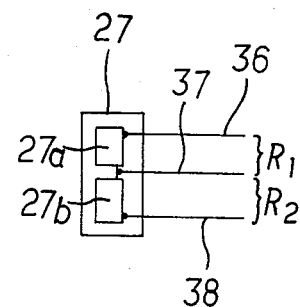
FIG. 5 is a schematic front elevational view of the magnetic resistance.

The present invention will be now described referring to the accompanying drawings in which the preferred embodiment of the pressure converter constructed in accordance with the principle of the invention is illustrated. The pressure converter generally comprises a main body or casing including an outer casing portion 1 provided with a center pressure inlet 2 in communication with an external pressure source (not shown). A diaphragm 3 is disposed within and extends across the interior of the casing portion. The diaphragm 3 is held in position within the casing portion 1 by means of an annular intermediate member 4 which is fitted in the casing portion and upholds the diaphragm. This diaphragm 3 defines an air-tight chamber 5 within the casing portion 1 in communication with the pressure inlet 2.

Reference numerals 7 and 7a denote annular spring plates received within the interior of the casing portion 1 in opposing and spaced relationship below the intermediate member 4. Each of the spring plates is warped upwardly at the central area and has a plurality of slits extending radially outwardly from the warped central area to provide a plurality of spring pieces 8, 8, ... The warped central area of the spring plate 7 (7a) is provided with a through hole 9. A piston 10 is disposed within the casing portion 1 for vertical movement therein and has the piston rod 11 which extends through the aligned through holes 9, 9 in the central areas of the spring plates 7, 7a.

A cylindrical stopper 12 is disposed between the opposing spring plates 7 and 7a to pinch the upper spring plate 7 in cooperation with the intermediate member 4 and has a center through opening 13 through which the piston rod 11 of the piston 10 extends. The casing further includes an inner casing portion 15 fitted in the outer casing portion 1 and pinches the lower spring plate 7a in cooperation with the stopper 12. Thus, the interior of the casing is divided by means of the diaphragm 3 into the above-mentioned air-tight chamber 5 above the diaphragm and an operation chamber 17 below the diaphragm.

The piston 10 is adapted to move upwardly and downwardly within the operation chamber 17 subjected to load within the air-tight chamber 5. The piston 10 is provided at the upper end with a first engaging member 18 having the diameter greater than that of the through opening 13 in the stopper 12. A second engaging member 20 having substantially the same diameter as the first engaging member 18 is positioned in an annular recess 19 in the piston rol 11 in an intermediate position between the upper and lower ends thereof and abutted by a washer 21 mounted on the piston rod. The lower end of the piston rod 11 is formed with a rounded end face 22.

A substantially U-shaped yoke 24 is secured to the bottom wall of the inner casing portion 15 by means of a bolt 25 and a conventional magnetic resistance 27 is attached to the inner surface of one of the upright legs 26 of the yoke 24. The magnetic resistance 27 is formed by a pair of series-connected magnetic resistance elements 27a, 27b the output voltage of which varies as a permanent magnet approaches and moves away from the magnetic resistance elements. The magnetic resistance elements 27a, 27b of the magnetic resistance 27 have the same characteristic and are to be exposed to the magnetic field of the permanent magnet 30 and the resistance elements have terminals 36, 37, 38 connected thereto, respectively (the terminal 37 is common to the two elements). The outer surface of the other upright leg 28 is formed adjacent to the upper end thereof with an acute notch 29 for receiving the correspondingly shaped lateral projection 32 at the base end of a movable member 31 to the leading end of which the permanent magnet 30 is attahced. The movable member 31 is pivotable about the acute projection 32 or fulcrum engaging in the notch 29 in the yoke leg 28 and a spring 33 extends between and is anchored to the lower end of the yoke leg 28 and the leading end of the movable member 31. Reference numeral 35 denotes an adjusting screw in threaded engagement with the inner casing portion 15 and adapted to adjust the position of the permanent magnet 30 relative to the magnetic resistance 27 by moving upwardly or downwardly the bottom of the yoke 24 at one end thereof by means of the adjusting screw. The movable member 31 moves upwardly and downwardly describing an arc about the fulcrum at the hinge point at the notch 29 without contacting the magnetic resistance and resistance value $R_1$ across the terminals 36, 37 and resistance value $R_2$ across the terminals 37, 38 vary depending upon the positions of the magnetic resistance elements 27a, 27b relative to the permanent magnet 30, respectively to thereby convert the position of the permanent magnet 30 into an electrical signal.

The piston 10 is normally biased upwardly by the action of the annular spring plates 7, 7a in which the second engaging member 20 abuts against the undersurface of the stopper 12. In this position wherein the piston 10 is biased upwardly, the movable member 31 is also resiliently biased upwardly by the force of the spring 33 to engage the rounded end face 22 of the piston rod 11.

As the pressure within the air-tight chamber 5 which is in communication with the external pressure source through the pressure inlet 2 increases, a downwardly directing force is applied to the piston 10 through the diaphragm 3 whereupon the piston 10 is resiliently pushed downwardly against the force of the two annular spring plates 7, 7a which normally bias the piston upwardly. In such a case, the operation direction of the piston 10 is pantographically determined by the annular spring plates 7, 7a and at the same time, the piston is subjected to a reaction force opposing the pressure applied thereto whereby the piston converts the pressure into a linear movement. Thus, the piston 10 and annular spring plates 7, 7a do not produce any frictional resistance therebetween as the piston 10 moves upwardly and downwardly and as a result, there is no loss of pressure.

When the piston 10 moves downwardly, the rounded end face 22 of the piston rod 11 pushes the movable member 31 downwardly to thereby vary the output voltage from the magnetic resistance 27 by the relative position between the permanent magnet 30 at the leading end of the movable member 31 and the magnetic resistance 27 to thereby convert the pressure into an electric signal.

Figure 6:
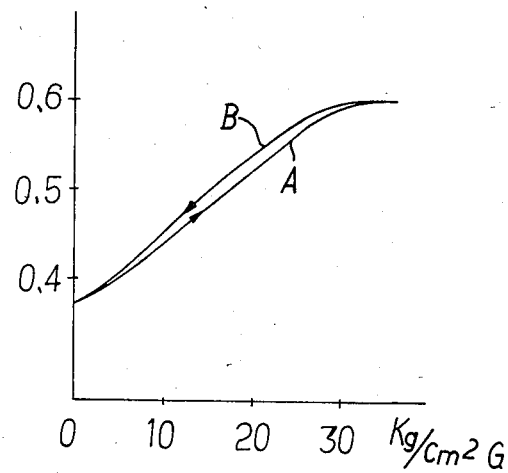
FIG. 6 is a diagram showing the relationship between input pressures to the magnetic resistance and permanent magnet and electrical output signals representing the pressures.

FIG. 6 shows the relationship between the input pressure and the output resistance ratio. In this Figure, Line A is a rising pressure curve and Line B is a drooping pressure curve. Although the difference between Lines A and B (divergence in FIG. 6) is principally caused by the piston 10 and diaphragm 3, since there is no frictional contact between the annular spring plates 7, 7a and the piston rol 11 in the pantograph arrangement according to the present invention, the pressure converter can be made compact.

With the above-mentioned construction and arrangement of the components of the pressure converter according to the present invention, the present invention provides the following effects:

(1) The annular spring plates adapted to apply load to the piston in opposition to pressure to be applied to the piston hold the piston in a pantographic fashion and there is no friction to produce between the spring plates and piston as the spring plates operate to thereby eliminate possible frictional resistance otherwise produced by the operation of the spring plates whereby no loss of pressure occurs and no error occurs when the pressure is converted into an electric signal.

(2) Since the piston is supported in a pantographic fashion by the annular spring plates, the operation direction of the piston is determined by the spring plates and the piston can be subjected to a reaction force against the pressure to be applied thereto whereby the pressure can be effectively converted into a linear movement.

(3) The magnetic resistance comprising the magnetic resistance elements is provided in the conversion zone where the position of the piston is adapted to convert the pressure into a stroke and thus, the pressure converter is quite simple in construction and light in weight whereby the pressure converter can be made compact.

While only one embodiment of the invention has been illustrated and described in detail, it will be understood that the same is for illustration purpose only and not to be taken as a definition of the invention, reference being had for the purpose to the appended claims.

What is claimed is:

1. A pressure converter comprising a cylindrical main body consisting of an outer casing portion having a center pressure inlet and an inner casing portion; a diaphragm disposed within and extending across said outer casing portion to divide the casing portion into an airtight chamber above said diaphragm and an operation chamber below the diaphragm; a piston received in said operation chamber for vertical movement in response to pressure from said air-tight chamber through said diaphragm and having an engaging member at one end; a pair of opposing and vertically spaced annular spring plates surrounding said piston; a stopper interposed between said pair of spring plates to be engaged by said engaging member; a permanent magnet disposed in a lower portion of said operation chamber; a magnetic resistance disposed within said operation chamber in opposition to said permanent magnet and adapted to produce output voltage which varies as the permanent magnet approaches and moves away from the magnetic resistance; a movable member supporting said permanent magnet at one end; and a spring anchored to said inner casing portion and said movable member to normally urge said piston to engage said movable member.

2. The pressure converter as set forth in claim 1, further including an intermediate member disposed between said diaphragm and the upper spring plate to hold the diaphragm in position.

3. The pressure converter as set forth in claim 1, in which said pair of spring plates form a pantograph structure to support said piston so as to prevent frictional movement of the piston relative to the spring plates.

4. The pressure coverter as set forth in claim 1, in which said piston includes a piston rod extending downwardly from the piston and having a rounded end face at the lower end to engage said movable member.

5. The pressure converter as set forth in claim 1, further including a substantially U-shaped yoke to support said movable member at the base end thereof.

6. The pressure converter as set forth in claim 5, in which said magnetic resistance is attached to one upright leg of said yoke and said permanent magnet is attached to the leading end of said movable member supported by the other upright leg of the yoke.

* * * * *